United States Patent Office 3,541,217
Patented Nov. 17, 1970

3,541,217
o-CHLOROBENZYLAMINOGUANIDINE FOR TREATING BOVINE KETOSIS
Frederick J. Marshall and Jack Mills, Indianapolis, Ind., assignors to Eli Lilly and Company, Indianapolis, Ind., a corporation of Indiana
No Drawing. Continuation-in-part of application Ser. No. 630,545, Apr. 13, 1967. This application June 30, 1969, Ser. No. 837,903
Int. Cl. A61k 27/00
U.S. Cl. 424—326      5 Claims

ABSTRACT OF THE DISCLOSURE o-Chlorobenzylaminoguanidine and its salts with pharmaceutically acceptable acids are active hyperglycemic compounds useful for the treatment of bovine ketosis.

CROSS REFERENCE TO PREVIOUS APPLICATION

This application is a continuation-in-part of our copending application Ser. No. 630,545, filed Apr. 13, 1967, now abandoned.

BACKGROUND OF THE INVENTION

This invention pertains to the use of a novel substituted benzylaminoguanidine, o-chlorobenzylaminoguanidine, for its effect on blood sugar. The compound benzylaminoguanidine is well known in the art, having been described in Beilstain, VII, 229.

SUMMARY

The compound employed in the method of this invention is o-chlorobenzylaminoguanidine, or a pharmaceutically acceptable acid addition salt thereof. The said compound and its salts unexpectedly demonstrate activity as hyperglycemic agents and are useful in the treatment of bovine ketosis.

DETAILED DESCRIPTION

The compound of the present invention is prepared by reacting an appropriate salt of aminoguanidine with o-chlorobenzaldehyde (both of which are available commercially), and subjecting the resulting chlorobenzaliminoguanidine salt to chemical reduction or to catalytic hydrogenation. Hydrogenation can be carried out by contacting the benzal compound with a catalyst comprising 5 percent palladium on aluminum oxide in alcohol, glacial acetic acid, or a mixture thereof, in a hydrogen atmosphere of about atmospheric pressure to about 100 p.s.i.g.

The pharmaceutically acceptable acid addition salts can be prepared by commingling equimolar amounts of the o-chlorobenzylaminoguanidine with an acid of the group consisting of hydrogen bromide, hydrogen chloride, sulfuric acid, phosphoric acid, acetic acid, naphthylenesulfonic acid, oxalic acid, tartaric acid, and the like.

o-Chlorobenzylaminoguanidine injected subcutaneously as the hydrochloride salt, at a dose of 25 mg./kg., caused a 61 mg. percent increase in blood sugar lasting more than 7 hours in all of a group of 6 guinea pigs. The test involved the following procedure:

Guinea pigs previously held without food for 18 hours were bled from a leg vein and a blood glucose level was determined from duplicate samples using the Technicon Autoanalyzer. The compound to be tested was then administered subcutaneously in aqueous solution at a dosage of 25 mg./kg. Six animals were given the test compound, and six animals were given an equal amount of water subcutaneously without the test substance. Duplicate samples of blood were obtained from a leg vein of each guinea pig at 1, 2, 3, 5, and 7 hours after the administration of the drug. The glucose level of each sample was determined, and the results were recorded as the mg. percent increase of glucose, compared with the controls, for each time period. These results were then averaged and an average value was recorded for each group of 6 animals. The methods of calculation are set forth in detail in the publication Diabetes, 8, 7–13 (1959).

In carrying out the novel therapeutic method of this invention, o-chlorobenzylaminoguanidine or an acid addition salt thereof, is administered to animals, as for example, cattle, suffering from ketosis. The dosage level employed varies according to the severity of the disease. For most animals, the daily administration of from 10–100 mg./kg. of body weight orally or from 0.05–1.00 mg./kg. of body weight intraperitoneally of the aminoguanidine, usually in the form of a non-toxic pharmaceutically-acceptable acid addition salt, serves to reduce urine ketone bodies to a normal level and maintain them at that level. The appropriate dose can be given at one time during the day or it can be divided into fractional parts and given several times during the day, as for example, with meals. The compound can be given by either the parenteral or oral route. The compound of the present invention is orally effective, however, and the oral method of administration is obviously preferred because of its greater convenience.

The compound, in order to be suitable for oral administration, must be formulated into pharmaceutically acceptable tablets, capsules, elixers, suspensions, solution, troches, or the like. These pharmaceutical forms employ the commonly used extending media and excipients well known to those skilled in the art. In a typical trial, 10 mg. of the hydrochloride salt of the compound herein provided is mixed with a suitable excipient as, for example, starch or milk sugar, filled into a hard-gelatin capsule, and administered orally one to five times a day depending upon the severity of the condition being treated. The hydrochloride salt of the above compound is water soluble and can be administered in liquid form, utilizing suitable flavoring agents to mask the undesirable flavor of the compound. Alternatively a water-insoluble salt, as, for example, the naphthalenesulfonate salt, can be administered as a suspension in an aqueous medium utilizing suitable coloring and flavoring agents.

The following specific compositions are illustrative of those useful in the therapeutic processes of this invention.

Capsules containing o-chlorobenzylaminoguanidine hydrochloride are prepared by thoroughly mixing 2.50 g. of the salt with 52.50 g. of starch and filling 0.22 g. of the mixture into each of a plurality of telescoping hard-gelatin capsules to provide a dose of 10 mg. of o-chlorobenzylaminoguanidine hydrochloride per capsule.

o-Chlorobenzylaminoguanidine hydrochloride is prepared in tablet form by mixing together 232 g. of the active drug, 1.624 g. of milk sugar, 452 g. of starch, and 12 g. of magnesium stearate, granulating the mixture, and pressing the granulation into scored tablets of such size that each contains about 10 mg. of the active drug.

Capsules containing a 5 mg. dose of the hydrochloride per capsule are prepared by thoroughly mixing 2.85 g. of the drug with 168.15 g. of starch and then filling 550 capsules each with about 0.3 g. of the mixture.

The following example will illustrate the preparation of the compound useful in the method of the present invention.

EXAMPLE

A mixture of 775 g. of aminoguanidine hydrochloride and 1175 g. of o-chlorobenzaldehyde in 4200 ml. of absolute ethanol was heated to reflux by the external application of steam for 3½ hours. After cooling, sufficient ether was adde to crystallize out the resulting product, 1-(o-chlorobenzalimino)-guanidine hydrochloride. Yield, 900 g. Melting point, 203–206° C.

Two hundred thirty-three grams of the o-chlorobenzaliminoguanidine hydrochloride were slurried in a mixture of 1 liter of absolute alcohol and 75 ml. of glacial acetic acid. Ten grams of 5 percent palladium on aluminum oxide were added, and the mixture was agitated in a hydrogen atmosphere for 4 hours at about 15 p.s.i.g. The catalyst was removed by filtration and the filtrate was evaporated in vacuo to an oil. The oil was dissolved in 500 ml. of anhydrous ethanol, and the solvent was again removed in vacuo. The resulting oil was again dissolved in 500 ml. of anhydrous ethanol and the remaining solid was removed by filtration and discarded. Ether was added slowly to the filtrate until evidence of a second phase appeared, and the resulting mixture was allowed to stand at room temperature for 5 days until crystallization was completed. The crystalline solid obtained thereby was o-chlorobenzylaminoguanidine hydrochloride, weighing 9.0 g., and melting at 117–119° C.

The compound of this invention is administered orally or parenterally to cows for the treatment of ketosis. Doses of 0.05 to 1.00 mg./kg. of animal body weight intraperitoneally or 10–100 mg./kg. orally cause a return to normal nutritional balance in the animal and alleviate the ketosis, as evidenced by the complete absence of ketone bodies in the urine.

We claim:

1. A method of treating bovine ketosis which comprises administering to the diseased animal a therapeutically effective amount of o-chlorobenzylaminoguanidine or a pharmaceutically acceptable salt thereof to reduce the urine ketone bodies to a normal level and maintain them at that level.

2. The method of claim 1 wherein the compound is administered orally.

3. The method of claim 1 wherein the compound is administered parenterally.

4. The method of claim 1 where the compound administered is the hydrochloride salt.

5. The method of claim 1 wherein about 10 to about 100 mg. of the compound per kilogram of animal body weight is administered orally.

References Cited
UNITED STATES PATENTS 3,391,189   7/1968   Mull _____ 424—326

ALBERT T. MEYERS, Primary Examiner

J. D. GOLDBERG, Assistant Examiner